US010416975B2

(12) United States Patent
Ishizaki

(10) Patent No.: US 10,416,975 B2
(45) Date of Patent: *Sep. 17, 2019

(54) COMPILING A PARALLEL LOOP WITH A COMPLEX ACCESS PATTERN FOR WRITING AN ARRAY FOR GPU AND CPU

(71) Applicant: INTERNATIONAL BUSINESS MACHINES CORPORATION, Armonk, NY (US)

(72) Inventor: Kazuaki Ishizaki, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/808,615

(22) Filed: Nov. 9, 2017

(65) Prior Publication Data
US 2018/0253290 A1 Sep. 6, 2018

Related U.S. Application Data

(63) Continuation of application No. 15/448,032, filed on Mar. 2, 2017.

(51) Int. Cl.
*G06F 9/44* (2018.01)
*G06F 13/36* (2006.01)
(Continued)

(52) U.S. Cl.
CPC ............. *G06F 8/452* (2013.01); *G06F 8/433* (2013.01); *G06F 8/447* (2013.01); *G06F 8/45* (2013.01);
(Continued)

(58) Field of Classification Search
CPC ........ G06F 8/453; G06F 8/456; G06F 8/4442; G06F 8/4441; G06F 8/4452; G06F 8/433;
(Continued)

(56) References Cited

U.S. PATENT DOCUMENTS 4,227,194 A * 10/1980 Herman .............. G01S 13/9017
342/25 E
8,549,500 B2 * 10/2013 Stefansson ................ G06T 1/20
717/148
(Continued)

OTHER PUBLICATIONS

Larry Carter et al., Languages and Compilers for Parallel Computing, Aug. 1999, [Retrieved on May 1, 2019]. Retrieved from the internet: 511 Pages (1-500) (Year: 1999).*
(Continued)

*Primary Examiner* — Anibal Rivera
(74) *Attorney, Agent, or Firm* — Tutunjian & Bitetto, P.C.; Vazken Alexanian

(57) ABSTRACT

Computer-implemented methods are provided for compiling a parallel loop and generating Graphics Processing Unit (GPU) code and Central Processing Unit (CPU) code for writing an array for the GPU and the CPU. A method includes compiling the parallel loop by (i) checking, based on a range of array elements to be written, whether the parallel loop can update all of the array elements and (ii) checking whether an access order of the array elements that the parallel loop reads or writes is known at compilation time. The method further includes determining an approach, from among a plurality of available approaches, to generate the CPU code and the GPU code based on (i) the range of the array elements to be written and (ii) the access order to the array elements in the parallel loop.

15 Claims, 16 Drawing Sheets

(51) Int. Cl.
*G06F 17/30* (2006.01)
*G06F 9/46* (2006.01)
*G06F 9/30* (2018.01)
*G06F 8/41* (2018.01)
*G06F 9/455* (2018.01)
*G06F 8/20* (2018.01)

(52) U.S. Cl.
CPC ............... *G06F 8/453* (2013.01); *G06F 8/20* (2013.01); *G06F 8/4442* (2013.01); *G06F 8/456* (2013.01); *G06F 9/4552* (2013.01)

(58) Field of Classification Search
CPC .............. G06F 8/452; G06F 17/30572; G06F 9/30036; G06F 9/5072; G06F 8/45; G06F 8/20; G06F 8/443; G06F 8/41; G06F 8/447; G06F 9/5027; G06F 9/54; G06F 9/4552; G06F 9/30181; G06F 11/3664
See application file for complete search history.

(56) References Cited

U.S. PATENT DOCUMENTS

| | | |
|---|---|---|
| 8,769,510 B2 * | 7/2014 | Martin ............... G06F 8/41 717/140 |
| 8,930,926 B2 * | 1/2015 | Bastoul ............ G06F 8/453 717/119 |
| 9,361,079 B2 | 6/2016 | Grover et al. |
| 9,715,386 B2 * | 7/2017 | Gonion ........... G06F 9/30036 |
| 9,733,914 B2 * | 8/2017 | Yi .................. G06F 8/4452 |
| 2007/0050603 A1 * | 3/2007 | Vorbach ......... G06F 9/30181 712/221 |
| 2007/0294512 A1 * | 12/2007 | Crutchfield ......... G06F 8/443 712/200 |
| 2007/0294663 A1 * | 12/2007 | McGuire ............ G06F 8/45 717/108 |
| 2007/0294665 A1 * | 12/2007 | Papakipos ........... G06F 8/45 717/119 |
| 2007/0294666 A1 * | 12/2007 | Papakipos ........... G06F 8/20 717/119 |
| 2007/0294671 A1 * | 12/2007 | Demetriou ....... G06F 11/3664 717/124 |
| 2007/0294680 A1 * | 12/2007 | Papakipos .......... G06F 8/456 717/149 |
| 2007/0294681 A1 * | 12/2007 | Tuck ............... G06F 11/3404 717/149 |
| 2007/0294682 A1 * | 12/2007 | Demetriou .......... G06F 8/45 717/153 |
| 2007/0294696 A1 * | 12/2007 | Papakipos ......... G06F 9/5027 718/102 |
| 2008/0005547 A1 * | 1/2008 | Papakipos ......... G06F 9/5027 712/244 |
| 2008/0229298 A1 * | 9/2008 | O'Brien ............ G06F 8/456 717/160 |
| 2010/0153654 A1 * | 6/2010 | Vorbach ........... G06F 12/0862 711/137 |
| 2010/0218196 A1 * | 8/2010 | Leung ............. G06F 8/453 718/107 |
| 2010/0250854 A1 * | 9/2010 | Ju ................. G06F 8/4442 711/125 |
| 2010/0306733 A1 * | 12/2010 | Bordelon ........... G06F 8/433 717/106 |
| 2010/0306736 A1 * | 12/2010 | Bordelon ........... G06F 8/452 717/109 |
| 2010/0306752 A1 * | 12/2010 | Bordelon .......... G06F 8/4452 717/149 |
| 2010/0306753 A1 * | 12/2010 | Yi ................. G06F 8/4452 717/149 |
| 2011/0035737 A1 * | 2/2011 | Stefansson ......... G06F 9/5072 717/149 |
| 2011/0238948 A1 * | 9/2011 | Vorbach .......... G06F 15/7867 712/15 |
| 2011/0252411 A1 * | 10/2011 | Martin ............. G06F 8/456 717/149 |
| 2012/0166765 A1 * | 6/2012 | Gonion ............ G06F 8/4441 712/200 |
| 2016/0011857 A1 * | 1/2016 | Grover ............. G06F 9/4552 717/148 |
| 2016/0267032 A1 * | 9/2016 | Rigetti ............ G06F 13/36 |
| 2016/0357529 A1 * | 12/2016 | Tsujimori ........... G06F 8/452 |
| 2016/0364216 A1 * | 12/2016 | Howes ............. G06F 8/41 |
| 2017/0154088 A1 * | 6/2017 | Sherman .......... G06F 9/45558 |
| 2017/0154089 A1 * | 6/2017 | Sherman .......... G06F 16/26 |

OTHER PUBLICATIONS

Minyi Guo et al., Symbolic Communication Set Generation for Irregular Parallel Applications, 2003, [Retrieved on May 1, 2019]. Retrieved from the internet: 16 Pages (199-214) (Year: 2003).*
Samadi, "Paragon: Collaborative Speculative Loop Execution on GPU and CPU", GPGPU-5, Mar. 2012, 10 pages.
Garg, Rahul, "A Tool Kit for building Dynamic Compilers for Array-Based Languages Targeting CPUS and GPUS", School of Computer Science, McGill University, Apr. 2015, 189 pages.
List of IBM Patents or Patent Applications Treated as Related dated Nov. 9, 2017, 2 pages.

* cited by examiner

```
public void Test extends Thread {
  int X[] = new int[200];
  int id;
  Test(int id) { this.id = id; }
  void test(int a[]) { IntStream.range(0, 100).parallel().forEach(i -> { a[2*i + id] += i; }
  ); }
  void run() { test(X); }
  public static void main(String[] a) { Test t0 = new Test(0); Test t1 = new Test(1);
  t0.start(); t1.start(); ... }
}
```

```
// code for CPU
void test(int a[]) {
  int *d_A, len = a.length, LB, UB, executeOnGPU;
  init(0, 100, &LB, &UB, &executeOnGPU);
  if (executeOnGPU) {
    int myLen = UB-LB+1;
    int t_a[] = new int[localLen];
    cudaMalloc(&d_A, myLen*4);
    for (int i = LB, ii = 0; i <= UB; i++) { t_a[ii++] = a[2*i+id]; }
    cudaMemcpy(t_a, d_A, myLen*4, Device2Host);
    cudaDeviceSynchronize();
    testGPU<<<SZ,SZ>>>(d_A, LB, UB);
    cudaMemcpy(t_a, d_A, myLen*4, Device2Host);
    for (int i = LB, ii = 0; i <= UB; i++) { a[2*i+id] = t_a[ii++]; }
    cudaFree(d_A);
    free(t_a);
  } else {
    for (int i = LB; i <= UB; i++) { a[2*i+id] += i; }
  }
}
```

```
// code for GPU
__global__ void testGPU(
int d_A[], int LB, int UB) {
int i = threadIdx.x + ...;
if (i < LB || UB < i) return;
int my_i = ...;
d_A[my_i] += i;
}
```

FIG. 8

```
public void Test extends Thread {
  int X[] = new int[100];
  int idx[] ...;
  int id;
  Test(int id) { this.id = id; }
  void test(int a[]) { IntStream.range(0, 100).parallel().forEach(i -> { a[idx[i]] += i; } ) }
  void run() { test(X); }
  public static void main(String[] a) { Test t0 = new Test(0); Test t1 = new Test(1);
    t0.start(); t1.start(); ...
  }
}
```

```
// code for CPU
volatile static int cnt_cpy_a = 0 fin_GPU; int *d_A, int *d_IDX;
void test(int a[]) {
    int len = a.length, LB, UB, executeOnGPU;
    fin_GPU = 0;
    init(0, 100, &LB, &UB, &executeOnGPU);
    if (executeOnGPU) {
        atomic_inc(cnt_cpy_a);
        if (atomic_inc(cnt_cpy_a) == 1) {
            cudaMalloc(&d_A, len*4); cudaMalloc(&d_IDX, len*4);
            cudaMemcpy(a, d_A, len*4, Device2Host);
            cudaMemcpy(idx, d_IDX, len*4, Device2Host); }
        cudaDeviceSynchronize();
        testGPU<<<SZ,SZ>>>(d_A, d_IDX, LB, UB);
        if (atomic_dec(cnt_cpy_a) == 0) {
            cudaMemcpy(a, d_A, len*4, Device2Host);
            cudaFree(d_A); cudaFree(d_IDX);
            fin_GPU = 1;
        }
    } else {
        while (fin_GPU == 0) {}
        for (int i = LB; i <= UB; i++) { a[idx[id]] += i; }
    }
}
```

FIG. 10

```
// code for GPU
__global__ void testGPU(
int d_A[], int d_IDX[],
int LB, int UB) {
int i = threadIdx.x + ...;
if (i < LB || UB < i) return;
d_A[d_IDX[i]] += i;
}
```

FIG. 11

```
public void Test extends Thread {
  int X[] = new int[300];
  int idx[] ...;
  int id;
  Test(int id) { this.id = id; }
  void test(int a[]) { if (id >=0) IntStream.range(0, 100).parallel().forEach(i -> { a[idx[3*i+id]] += i; } );
  else a[2] = 2;}
  void run() { test(X); }
    ublic static void main(String[] a) { Test t0 = new Test(0); Test t1 = new Test(1); Test t2 = new Test(-1);
    t0.start(); t1.start(); t2.start(); ... }
}
```

FIG. 12

```
// code for CPU
volatile static int cnt_cpy_a = 0; int *d_A, int *d_IDX;
void test(int a[]) {
  int len = a.length, LB, UB, executeOnGPU;
  init(0, 100, &LB, &UB, &executeOnGPU);
  if (executeOnGPU) {
    atomic_inc(cnt_cpy_a);
    if (atomic_inc(cnt_cpy_a) == 1) {
      cudaMalloc(&d_A, len*4); cudaMalloc(&d_IDX, len*4);
      cudaMemcpy(a, d_A, len*4, Device2Host);
      cudaMemcpy(a, d_IDX, len*4, Device2Host); }
    cudaDeviceSynchronize();
    testGPU<<<SZ,SZ>>>(d_A, d_IDX, id, LB, UB);
    if (atomic_dec(cnt_cpy_a) == 0) {
      cudaMemcpy(t_a, d_A, len*4, Device2Host);
      cudaFree(d_A); cudaFree(d_IDX); }
    while (cnt_cpy_a != 0) {}
    for (int i = LB; i <= UB; i++) { a[idx[3*i+id]] = t_a[i]; }
  } else {
    for (int i = LB; i <= UB; i++) { a[idx[3*i+id]] = i; }
  }
}
```

FIG. 13

```
// code for GPU
__global__ void testGPU(
int d_A[], int d_IDX[],
int id, int LB, int UB) {
int i = threadIdx.x + ...;
if (i < LB || UB < i) return;
d_A[d_IDX[3*i+id]] += i;
}
```

```
for (j = 1; j < N; j += 2) {
    for (i = 1; i < N; i += 2) {
        a[i+j*N] = ...
    }
}
for (j = 0; j < N; j += 2) {
    for (i = 0; i < N; i += 2) {
        a[i+j*N] = ...
    }
}
```

```
for (j = 0; j < N; j++) {
    for (i = 0; i < j; i++) {
        a[i+(j*(j+1))/2] = ...
    }
}
```

```
for (i = 0; i < N; i++) {
  a[idx[i]] = ...
}
```

FIG. 18

```
for (i = 0; i < N; i++) {
  if (b[i] > 0) {
    a[i] = ...
  }
}
```

FIG. 17

COMPILING A PARALLEL LOOP WITH A COMPLEX ACCESS PATTERN FOR WRITING AN ARRAY FOR GPU AND CPU

BACKGROUND

Technical Field

The present invention relates generally to information processing and, in particular, to compiling a parallel loop with a complex access pattern for writing an array for a Graphics Processing Unit (GPU) and a Central Processing Unit (CPU).

Description of the Related Art

For high performance, an Application Programming Interface (API) is provided for data transfer between a Central Processing Unit (CPU) and a Graphics Processing Unit (GPU), by which only contiguous memory regions are transferred there between. For example, such an API would include cudaMemcpy in CUDA®, the memory coherency mechanism per page in NVLink®, and the cache coherency mechanism per cache line in NVLink2.

For a parallel loop that is executed by multiple threads with write operations to an array, it is not easy for a compiler to generate parallel code for the GPU and CPU which can be executed in parallel when regions of an array to be written by a thread are not contiguous. For example, one difficulty is that it is not known how to correctly generate parallel code in the case that a part of an array is written by other threads that do not execute the parallel loop. As another example, in the case that all of the array elements are written by a parallel loop, a result may be wrong if multiple threads perform data transfer for the whole array from the GPU to CPU. This is because this transfer may update array elements that were not updated by the GPU and were updated by the CPU.

The preceding can be illustrated with respect to the following sample pseudocode program:

```
public void Test extends Thread {
    int X[ ] = new int[1000];
    int id;
    Test(int id) { this.id = id; }
    void test(int a[ ]) {
        if (id >= 0)
            IntStream.rangeClosed(0, 100).
                        parallel( ).forEach(i -> {
                        a[3*i + id] += i; } ); }
        else a[2] = 2;
    void run( ) { test(X); }
            public static void main(String[ ] a) {
            Test t0 = new Test(0);
            Test t1 = new Test(1);
            Test t2 = new Test(-1);
            t0.start( ); t1.start( ); t2.start( );
            ...
    }
}
```

As can be determined relative to the preceding pseudocode, a problem exists in how to correctly generate parallel code in the case that a part of an array is written by other threads that do not execute the parallel loop (t2 in a sample pseudocode program).

As can also be determined relative to the preceding pseudocode, another problem exists in how to generate code for GPU and CPU for a parallel loop, which is executed by multiple threads with write operations to an array, in the case that each thread writes data into contiguous array elements (t0 and t1 in a sample pseudocode program).

SUMMARY

According to an aspect of the present invention, a computer-implemented method is provided for compiling a parallel loop and generating Graphics Processing Unit (GPU) code and Central Processing Unit (CPU) code for writing an array for the GPU and the CPU. The method includes compiling the parallel loop by (i) checking, based on a range of array elements to be written, whether the parallel loop can update all of the array elements and (ii) checking whether an access order of the array elements that the parallel loop reads or writes is known at compilation time. The method further includes determining an approach, from among a plurality of available approaches, to generate the CPU code and the GPU code based on (i) the range of the array elements to be written and (ii) the access order to the array elements in the parallel loop.

According to another aspect of the present invention, a computer program product is provided for compiling a parallel loop and generating Graphics Processing Unit (GPU) code and Central Processing Unit (CPU) code for writing an array for the GPU and the CPU. The computer program product includes a non-transitory computer readable storage medium having program instructions embodied therewith. The program instructions are executable by a computer to cause the computer to perform a method. The method includes compiling the parallel loop by (i) checking, based on a range of array elements to be written, whether the parallel loop can update all of the array elements and (ii) checking whether an access order of the array elements that the parallel loop reads or writes is known at compilation time. The method further includes determining an approach, from among a plurality of available approaches, to generate the CPU code and the GPU code based on (i) the range of the array elements to be written and (ii) the access order to the array elements in the parallel loop.

According to yet another aspect of the present invention, a computer processing system is provided for compiling a parallel loop and generating Graphics Processing Unit (GPU) code and Central Processing Unit (CPU) code for writing an array. The computer processing system includes a GPU and a CPU. The GPU and the CPU are configured to compile the parallel loop by (i) checking, based on a range of array elements to be written, whether the parallel loop can update all of the array elements and (ii) checking whether an access order of the array elements that the parallel loop reads or writes is known at compilation time. The GPU and the CPU are further configured to determine an approach, from among a plurality of available approaches, to generate the CPU code and the GPU code based on (i) the range of the array elements to be written and (ii) the access order to the array elements in the parallel loop.

According to still another aspect of the present invention, a computer-implemented method is provided for compiling a parallel loop and generating Graphics Processing Unit (GPU) code and Central Processing Unit (CPU) code for writing an array for the GPU and the CPU. The method includes compiling the parallel loop by (i) checking, based on a range of array elements to be written with respect to any of an index of the parallel loop, whether the parallel loop can update all of the array elements and (ii) checking whether an access order of the array elements that the parallel loop reads or writes is known at compilation time based on the index of the parallel loop. The method further includes determining an approach, from among a plurality of available approaches, to generate the CPU code and the GPU code based on (i) the range of the array elements to be written and (ii) the access order to the array elements in the parallel loop. The GPU code and the CPU code are generated to be executable in parallel when regions of the array to be written are non-contiguous.

According to still yet another aspect of the present invention, a computer program product is provided for compiling a parallel loop and generating Graphics Processing Unit (GPU) code and Central Processing Unit (CPU) code for writing an array for the GPU and the CPU. The computer program product includes a non-transitory computer readable storage medium having program instructions embodied therewith. The program instructions are executable by a computer to cause the computer to perform a method. The method includes compiling the parallel loop by (i) checking, based on a range of array elements to be written with respect to any of an index of the parallel loop, whether the parallel loop can update all of the array elements and (ii) checking whether an access order of the array elements that the parallel loop reads or writes is known at compilation time based on the index of the parallel loop. The method further includes determining an approach, from among a plurality of available approaches, to generate the CPU code and the GPU code based on (i) the range of the array elements to be written and (ii) the access order to the array elements in the parallel loop. The GPU code and the CPU code are generated to be executable in parallel when regions of the array to be written are non-contiguous.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 6 shows an exemplary source program to which the present invention can be applied, in accordance with an embodiment of the present invention;

FIG. 7 shows exemplary pseudocode for a CPU based on the source program of FIG. 6, in accordance with an embodiment of the present invention;

FIG. 8 shows exemplary pseudocode for a GPU based on the source program of FIG. 6, in accordance with an embodiment of the present invention;

FIG. 9 shows another exemplary source program to which the present invention can be applied, in accordance with an embodiment of the present invention;

FIG. 10 shows exemplary pseudocode for a CPU based on the source program of FIG. 9, in accordance with an embodiment of the present invention;

FIG. 11 shows exemplary pseudocode for a GPU based on the source program of FIG. 9, in accordance with an embodiment of the present invention;

FIG. 12 shows yet another exemplary source program to which the present invention can be applied, in accordance with an embodiment of the present invention;

FIG. 13 shows exemplary pseudocode for a CPU based on the source program of FIG. 12, in accordance with an embodiment of the present invention;

FIG. 14 shows exemplary pseudocode for a GPU based on the source program of FIG. 12, in accordance with an embodiment of the present invention;

FIG. 15 shows exemplary pseudocode having a loop for a red black SOR method, to which the present invention can be applied, in accordance with an embodiment of the present invention;

FIG. 16 shows exemplary pseudocode having a loop for a triangular array, to which the present invention can be applied, in accordance with an embodiment of the present invention;

FIG. 17 shows exemplary pseudocode having a loop with a complicated loop body, to which the present invention can be applied, in accordance with an embodiment of the present invention; and FIG. 18 shows exemplary pseudocode having another loop with another complicated loop body, to which the present invention can be applied, in accordance with an embodiment of the present invention.

DETAILED DESCRIPTION

The present invention is directed to compiling a parallel loop with a complex access pattern for writing an array for a Graphics Processing Unit (GPU) and a Central Processing Unit (CPU).

Based on a range of elements to be written and an access order to elements in a parallel loop, the present invention decides the best approach to generate CPU and GPU code.

Figure 1:
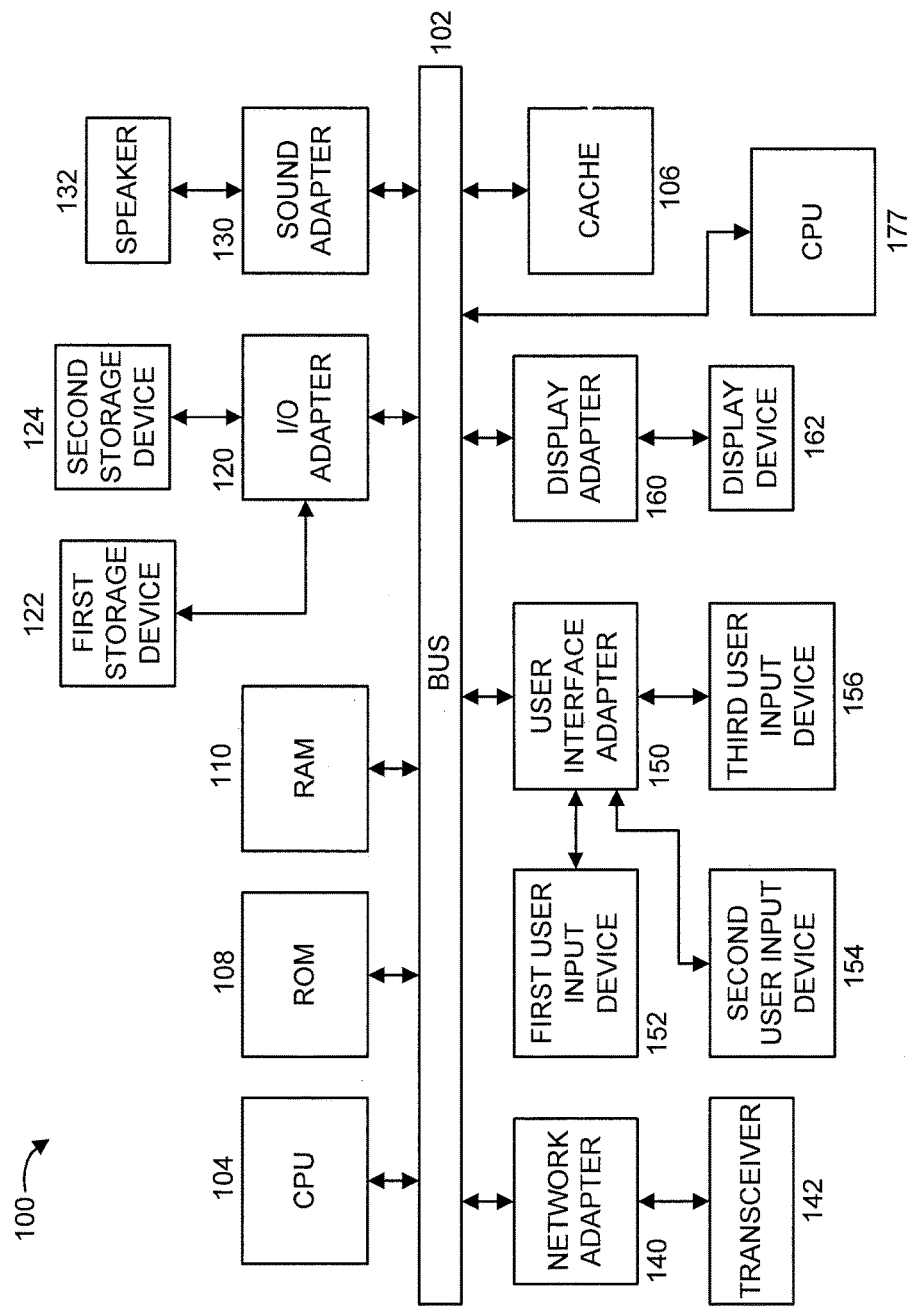
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one Central Processing Unit (CPU) 104 and at least one Graphics Processing Unit (GPU) 177 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

It is to be appreciated that processing system 100 may perform at least part of the method described herein including, for example, at least part of method 200 of FIGS. 2-5.

Figure 2:
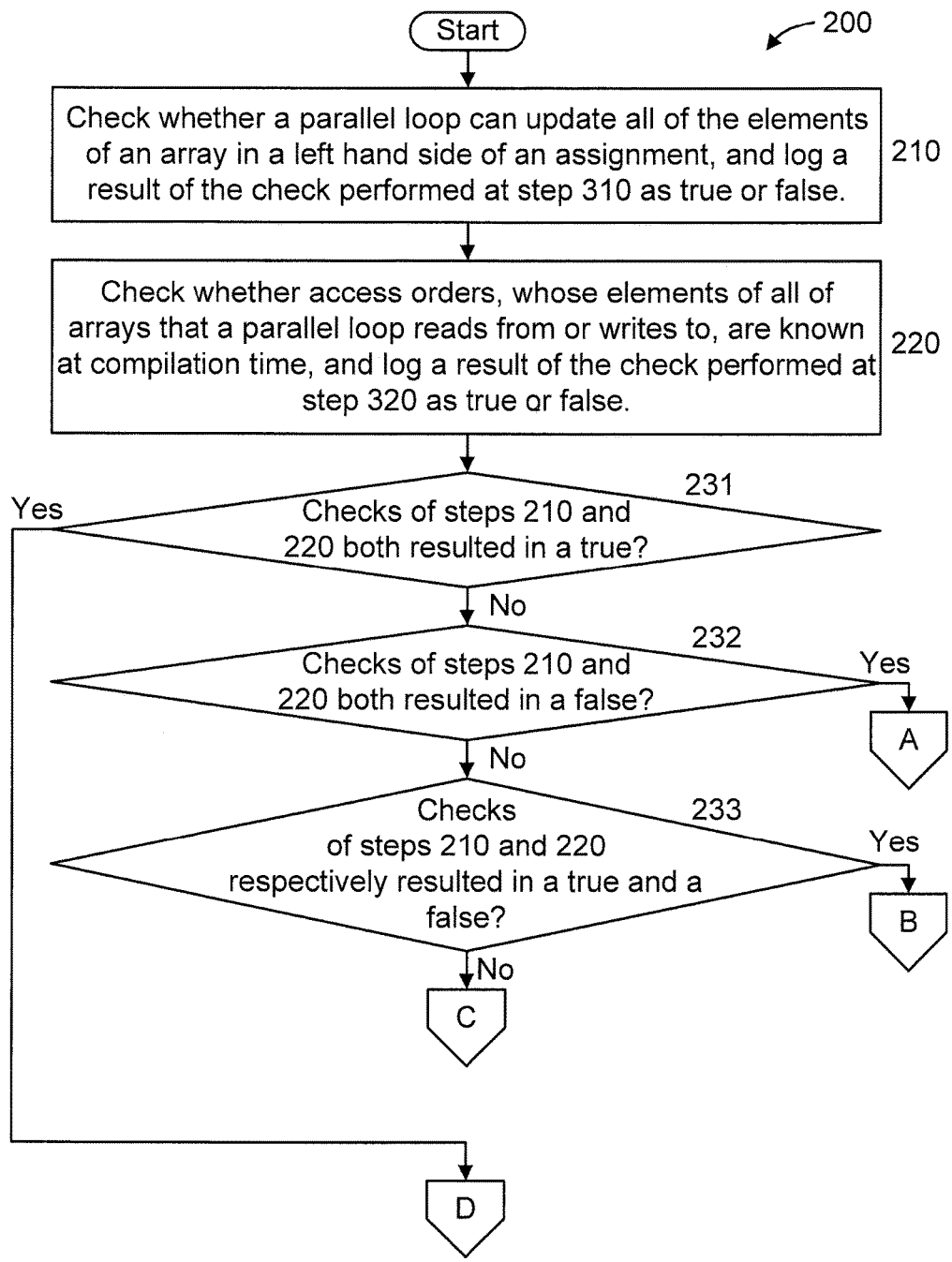
FIGS. 2-5 show an exemplary method for compiling a parallel loop with a complex access pattern for writing an array for a Graphics Processing Unit (GPU) and a Central Processing Unit (CPU), in accordance with an embodiment of the present invention.
Figure 3:
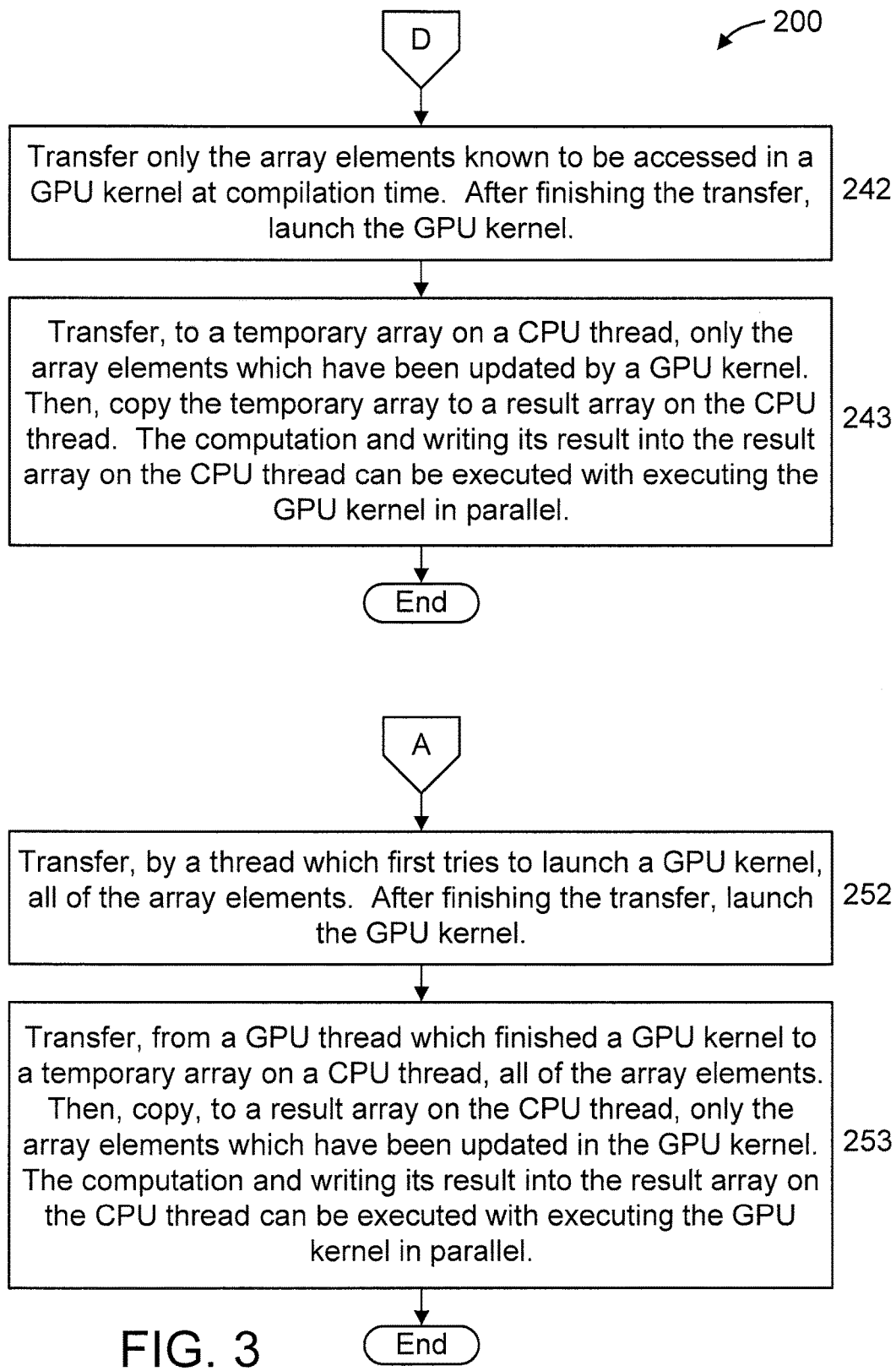
Figure 4:
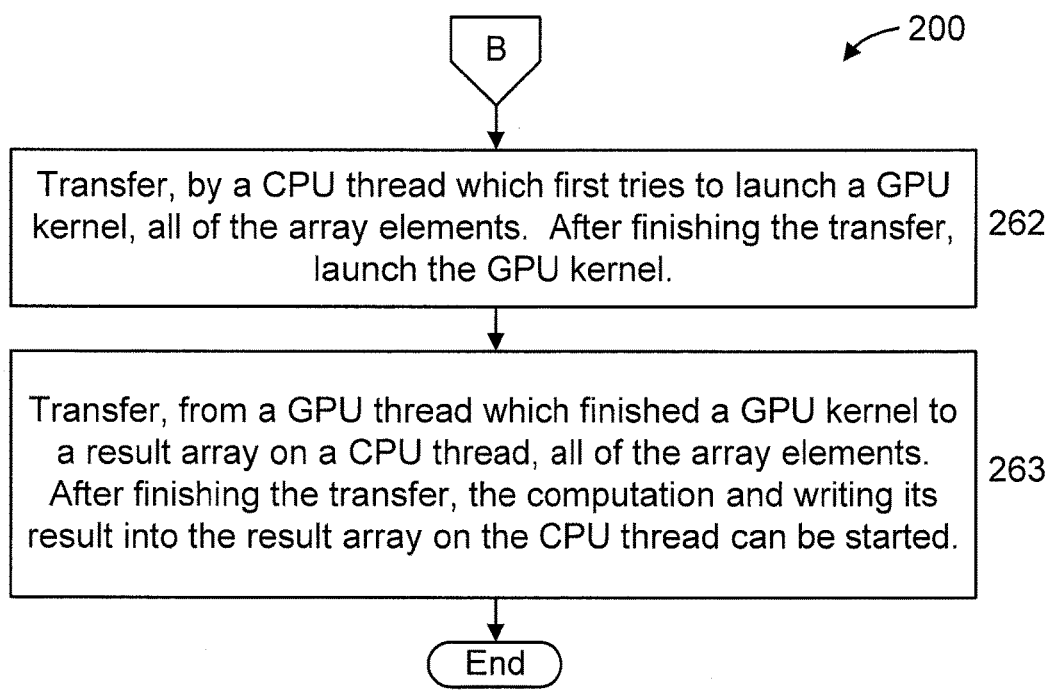
Figure 5:
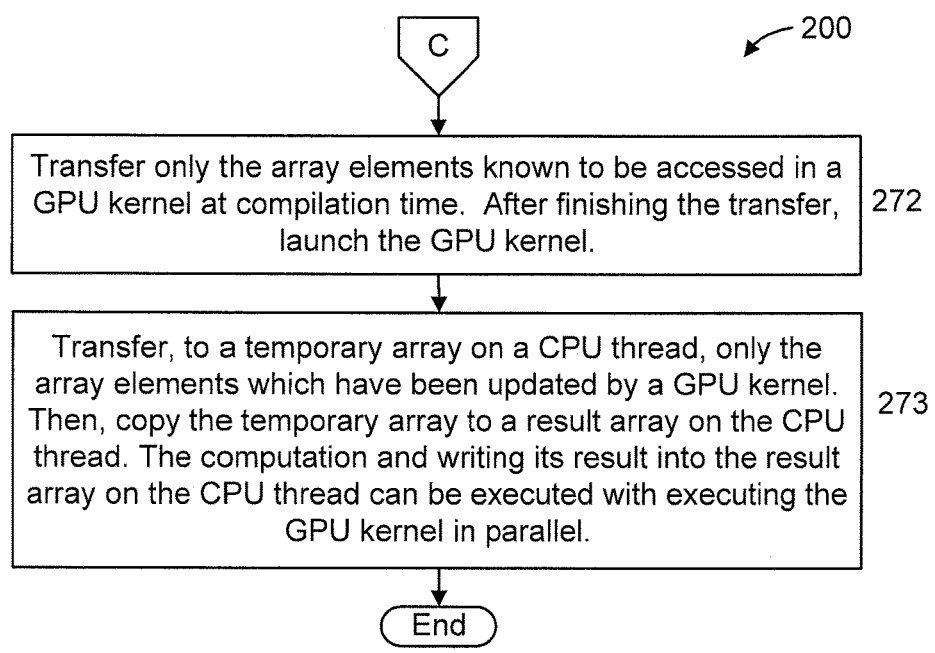

FIG. 2 shows an exemplary method 200 for compiling a parallel loop with a complex access pattern for writing an array for a Graphics Processing Unit (GPU) and a Central Processing Unit (CPU), in accordance with an embodiment of the present invention.

At step 210, check whether a parallel loop can update all of the elements of an array in a left hand side of an assignment, and log a result of the check performed at step 210 as true or false.

As an example regarding step 210, a true would result when (1) a range of elements of an array is equal to a range of a loop index to be updated, (2) a subscript expression of an array is equal to a loop index, and (3) an assignment to an array is always executed in a loop iteration. An example of the preceding is as follows: "for (i=0; I<a.length; i++) {a[i]+=i:}.

As another example regarding step 210, a true would result when (1) a range of elements of an array are included by all of the values of an index array (e.g., idx[ ]) by using abstract interpretation, annotation, runtime inspection, and/ or so forth, (2) a subscription expression of an index array is equal to an loop index, and (3) an assignment to an array is always executed in a loop iteration. An example of the preceding is as follows: "for (i=0; I<a.length; i++) {a[idx [i]]+=i:}.

At step 220, check whether access orders, whose elements of all of arrays that a parallel loop reads from or writes to, are known at compilation time, and log a result of the check performed at step 220 as true or false.

As an example regarding step 220, a true would result when (1) a subscription expression of an array consist of a loop index and loop invariant variable that can be evaluated at compilation time, and (2) an assignment to an array is always executed in a loop iteration. An example of the preceding is as follows: "for (i=0; I<a.length/2-1; i++) {a[2*I+1]+=I}:".

At step 231, determine whether the checks of steps 210 and 220 both resulted in a true. If so, then proceed to step 242. Otherwise, proceed to step 232.

At step 232, determine whether the checks of steps 210 and 220 both resulted in a false. If so, then proceed to step 252. Otherwise, proceed to step 233

At step 233, determine whether the check of step 210 resulted in a true and the check of step 220 resulted in a false. If so, then proceed to step 262. Otherwise, proceed to step 272.

At step 242 (for data transfer from CPU to GPU), transfer only the array elements known to be accessed in a GPU kernel at compilation time. After finishing the transfer, launch the GPU kernel.

At step 243 (for data transfer from GPU to CPU), transfer, to a temporary array on a CPU thread, only the array elements which have been updated by a GPU kernel. Then, copy the temporary array to a result array on the CPU thread. The computation and writing its result into the result array on the CPU thread can be executed with executing the GPU kernel in parallel.

At step 252, (for data transfer from CPU to GPU), transfer, by a thread which first tries to launch a GPU kernel, all of the array elements. After finishing the transfer, launch the GPU kernel.

At step 253 (for data transfer from GPU to CPU), transfer, from a GPU thread which finished a GPU kernel to a temporary array on a CPU thread, all of the array elements. Then, copy, to a result array on the CPU thread, only the array elements which have been updated in the GPU kernel. The computation and writing its result into the result array on the CPU thread can be executed with executing the GPU kernel in parallel.

At step 262 (for data transfer from CPU to GPU), transfer all of the array elements of a CPU thread which first tries to launch a GPU kernel. After finishing the transfer, launch the GPU kernel.

At step 263 (for data transfer from GPU to CPU), transfer, to a result array on a CPU thread, all of the array elements of a thread which finished a GPU kernel. After finishing the transfer the computation and writing its result into the result array on the CPU thread can be started.

At step 272 (for data transfer from CPU to GPU), transfer only the array elements known to be accessed in a GPU kernel at compilation time. After finishing the transfer, launch the GPU kernel.

At step 273 (for data transfer from GPU to CPU), transfer, to a temporary array on a CPU thread, only the array elements which have been updated by a GPU kernel. Then, copy the temporary array to a result array on the CPU thread. The computation and writing its result into the result array on the CPU thread can be executed with executing the GPU kernel in parallel.

FIG. 6 shows an exemplary source program 600 to which the present invention can be applied, in accordance with an embodiment of the present invention. The source program 600 involves a parallel loop that updates all of the array elements in a left hand side of an assignment, and access orders of those arrays are known at compilation time.

FIG. 7 shows exemplary pseudocode 700 for a CPU based on source program 600 of FIG. 6, in accordance with an embodiment of the present invention.

FIG. 8 shows exemplary pseudocode 800 for a GPU based on source program 600 of FIG. 6, in accordance with an embodiment of the present invention.

FIG. 9 shows another exemplary source program 900 to which the present invention can be applied, in accordance with an embodiment of the present invention. The source program 900 involves a parallel loop that updates all of the array elements in a left hand side of an assignment, and access orders of those arrays are unknown at compilation time.

FIG. 10 shows exemplary pseudocode 1000 for a CPU based on source program 900 of FIG. 9, in accordance with an embodiment of the present invention.

FIG. 11 shows exemplary pseudocode 1100 for a GPU based on source program 900 of FIG. 9, in accordance with an embodiment of the present invention.

FIG. 12 shows another exemplary source program 1200 to which the present invention can be applied, in accordance with an embodiment of the present invention. The source program 1200 involves a parallel loop that may not update all of the array elements in a left hand side of an assignment, and access orders of those arrays are unknown at compilation time.

FIG. 13 shows exemplary pseudocode 1300 for a CPU based on source program 1200 of FIG. 12, in accordance with an embodiment of the present invention.

FIG. 14 shows exemplary pseudocode 1400 for a GPU based on source program 1200 of FIG. 12, in accordance with an embodiment of the present invention.

In an embodiment, coverage of target programs of a compiler for GPU is expanded. For example, IBM Java 8 SR3 can compile only a parallel loop in the case that an array in a left hand side of an assignment has an subscript expression such as a[i] and is not within an "if" statement. The present invention allows a compiler to compile more complicated types of parallel loops.

FIG. 15 shows exemplary pseudocode 1500 having a loop for a red black SOR method, to which the present invention can be applied, in accordance with an embodiment of the present invention.

FIG. 16 shows exemplary pseudocode 1600 having a loop for a triangular array, to which the present invention can be applied, in accordance with an embodiment of the present invention.

Figures 17, 18:
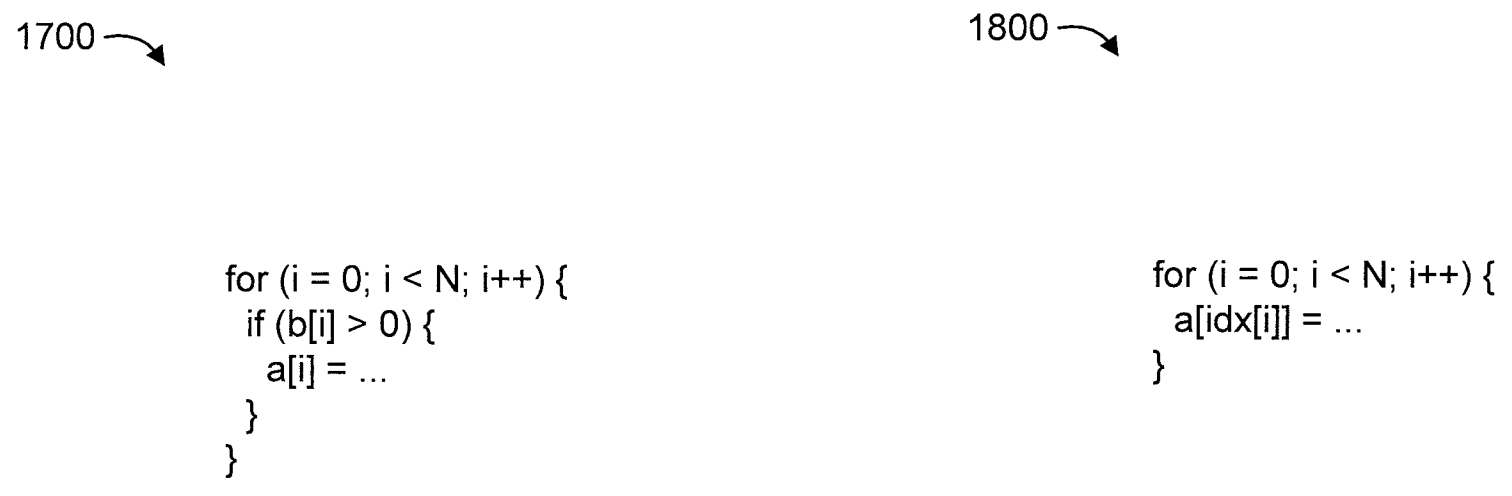

FIG. 17 shows exemplary pseudocode 1700 having a loop with a complicated loop body, to which the present invention can be applied, in accordance with an embodiment of the present invention.

FIG. 18 shows exemplary pseudocode 1800 having another loop with another complicated loop body, to which the present invention can be applied, in accordance with an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws,

What is claimed and desired protected by Letters Patent is set forth in the appended claims:

1. A computer program product for compiling a parallel loop and generating Graphics Processing Unit (GPU) code and Central Processing Unit (CPU) code for writing an array for the GPU and the CPU, the computer program product comprising a non-transitory computer readable storage medium having program instructions embodied therewith, the program instructions executable by a computer to cause the computer to perform a method comprising:

compiling the parallel loop by (i) checking, based on a range of array elements to be written, whether the parallel loop can update all of the array elements and (ii) checking whether an access order of the array elements that the parallel loop reads or writes is known at compilation time; and determining an approach, from among a plurality of available approaches, to generate the CPU code and the GPU code based on (i) the range of the array elements to be written and (ii) the access order to the array elements in the parallel loop, wherein (i) checking, based on a range of array elements to be written, whether the parallel loop can update all of the array elements comprises:

checking whether the range of array elements to be written is equal to a range of an index of the parallel loop to be updated;

checking whether a subscript expression of the array is equal to the index of the loop array to be updated; and checking whether an assignment to the array is always executed in an iteration of the parallel loop.

2. The computer program product of claim 1, wherein the GPU code and the CPU code are generated to be executable in parallel when regions of the array to be written are non-contiguous.

3. The computer program product of claim 1, wherein (i) checking, based on a range of array elements to be written, whether the parallel loop can update all of the array elements comprises:

checking whether the range of array elements to be written are included in values of an index array;

checking whether a subscript expression of the index array is equal to an index of the parallel loop to be updated; and checking whether an assignment to the array is always executed in an iteration of the parallel loop.

4. The computer program product of claim 1, wherein (ii) checking whether an access order of the array elements that the parallel loop reads or writes is known at compilation time comprises:

checking whether a subscript expression of the array consists of an index of the parallel loop and a loop invariant variable that can be evaluated at compilation time; and checking whether an assignment to the array is always executed in an iteration of the parallel loop.

5. The computer program product of claim 1, wherein for
(a) a true result in said compiling step for both the (i) checking and the (ii) checking, and
(b) a current data transfer from the CPU to the GPU, said determining step determines the approach to include:
   performing a transfer of only the array elements known to have been accessed in a GPU kernel at compilation time; and
   launching the GPU kernel, after completing the transfer.

6. The computer program product of claim 1, wherein for (a) a true result in said compiling step for both the (i) checking and the (ii) checking, and
(b) a current data transfer from the GPU to the CPU,
said determining step determines the approach to include:
   transferring, to a temporary array on a CPU thread, only the array elements which have been updated by a GPU kernel; and
   copying the temporary array to a result array on the CPU thread.

7. The computer program product of claim 1, wherein for (a) a false result in said compiling step for both the (i) checking and the (ii) checking, and
(b) a current data transfer from the CPU to the GPU,
said determining step determines the approach to include:
   performing, by a CPU thread which first tries to launch a GPU kernel, a transfer of all of the array elements; and
   launching the GPU kernel, after completing the transfer.

8. The computer program product of claim 1, wherein for (a) a false result in said compiling step for both the (i) checking and the (ii) checking, and
(b) a current data transfer from the GPU to the CPU,
said determining step determines the approach to include:
   transferring, from a GPU thread which finished a GPU kernel to a temporary array on a CPU thread, all of the array elements; and
   copying, to a result array on the CPU thread, only the array elements which have been updated in the GPU kernel.

9. The computer program product of claim 1, wherein for (a) a true result in said compiling step for the (i) checking and a false result in said compiling step for the ii) checking, and
(b) a current data transfer from the CPU to the GPU,
said determining step determines the approach to include:
   performing a transfer, by a thread which first tries to launch a GPU kernel, of all of the array elements; and
   launching the GPU kernel, after completing the transfer.

10. The computer program product of claim 1, wherein for (a) a true result in said compiling step for the (i) checking and a false result in said compiling step for the ii) checking, and
(b) a current data transfer from the GPU to the CPU,
said determining step determines the approach to include:
   performing a transfer, from a GPU thread which finished a GPU kernel to a result array on a CPU thread, of all of the array elements;
   starting a computation and a writing of a transfer result into the result array on the CPU thread, after completing the transfer.

11. The computer program product of claim 1, wherein for (a) a false result in said compiling step for the (i) checking and a true result in said compiling step for the ii) checking, and
(b) a current data transfer from the CPU to the GPU,
said determining step determines the approach to include:
   performing a transfer of only the array elements known to be accessed in a GPU kernel at compilation time; and
   launching the GPU kernel, after completing the transfer.

12. The computer program product of claim 1, wherein for (a) a false result in said compiling step for the (i) checking and a true result in said compiling step for the ii) checking, and
(b) a current data transfer from the GPU to the CPU,
said determining step determines the approach to include:
   transferring, to a temporary array on a CPU thread, only the array elements which have been updated by a GPU kernel; and
   copying the temporary array to a result array on the CPU thread.

13. A computer processing system for compiling a parallel loop and generating Graphics Processing Unit (GPU) code and Central Processing Unit (CPU) code for writing an array, the computer processing system comprising:
   a GPU and a CPU, configured to:
      compile the parallel loop by (i) checking, based on a range of array elements to be written, whether the parallel loop can update all of the array elements and (ii) checking whether an access order of the array elements that the parallel loop reads or writes is known at compilation time; and
   determine an approach, from among a plurality of available approaches, to generate the CPU code and the GPU code based on (i) the range of the array elements to be written and (ii) the access order to the array elements in the parallel loop,
   wherein (i) checking, based on a range of array elements to be written, whether the parallel loop can update all of the array elements comprises:
      checking whether the range of array elements to be written is equal to a range of an index of the parallel loop to be updated;
      checking whether a subscript expression of the array is equal to the index of the loop array to be updated; and
      checking whether an assignment to the array is always executed in an iteration of the parallel loop.

14. The computer processing system of claim 13, wherein the GPU code and the CPU code are generated to be executable in parallel when regions of the array to be written are non-contiguous.

15. A computer program product for compiling a parallel loop and generating Graphics Processing Unit (GPU) code and Central Processing Unit (CPU) code for writing an array for the GPU and the CPU, the computer program product comprising a non-transitory computer readable storage medium having program instructions embodied therewith, the program instructions executable by a computer to cause the computer to perform a method comprising:
   compiling the parallel loop by (i) checking, based on a range of array elements to be written with respect to any of an index of the parallel loop, whether the parallel loop can update all of the array elements and (ii) checking whether an access order of the array elements that the parallel loop reads or writes is known at compilation time based on the index of the parallel loop; and
   determining an approach, from among a plurality of available approaches, to generate the CPU code and the GPU code based on (i) the range of the array elements to be written and (ii) the access order to the array elements in the parallel loop, wherein the GPU code and the CPU code are generated to be executable in parallel when regions of the array to be written are non-contiguous, wherein (i) checking, based on a range of array elements to be written, whether the parallel loop can update all of the array elements comprises:

checking whether the range of array elements to be written is equal to a range of an index of the parallel loop to be updated;

checking whether a subscript expression of the array is equal to the index of the loop array to be updated; and checking whether an assignment to the array is always executed in an iteration of the parallel loop.

* * * * *